Dec. 20, 1960   R. E. OSBORNE   2,964,967
STEERING GEAR OR THE LIKE
Filed April 19, 1957   2 Sheets-Sheet 1
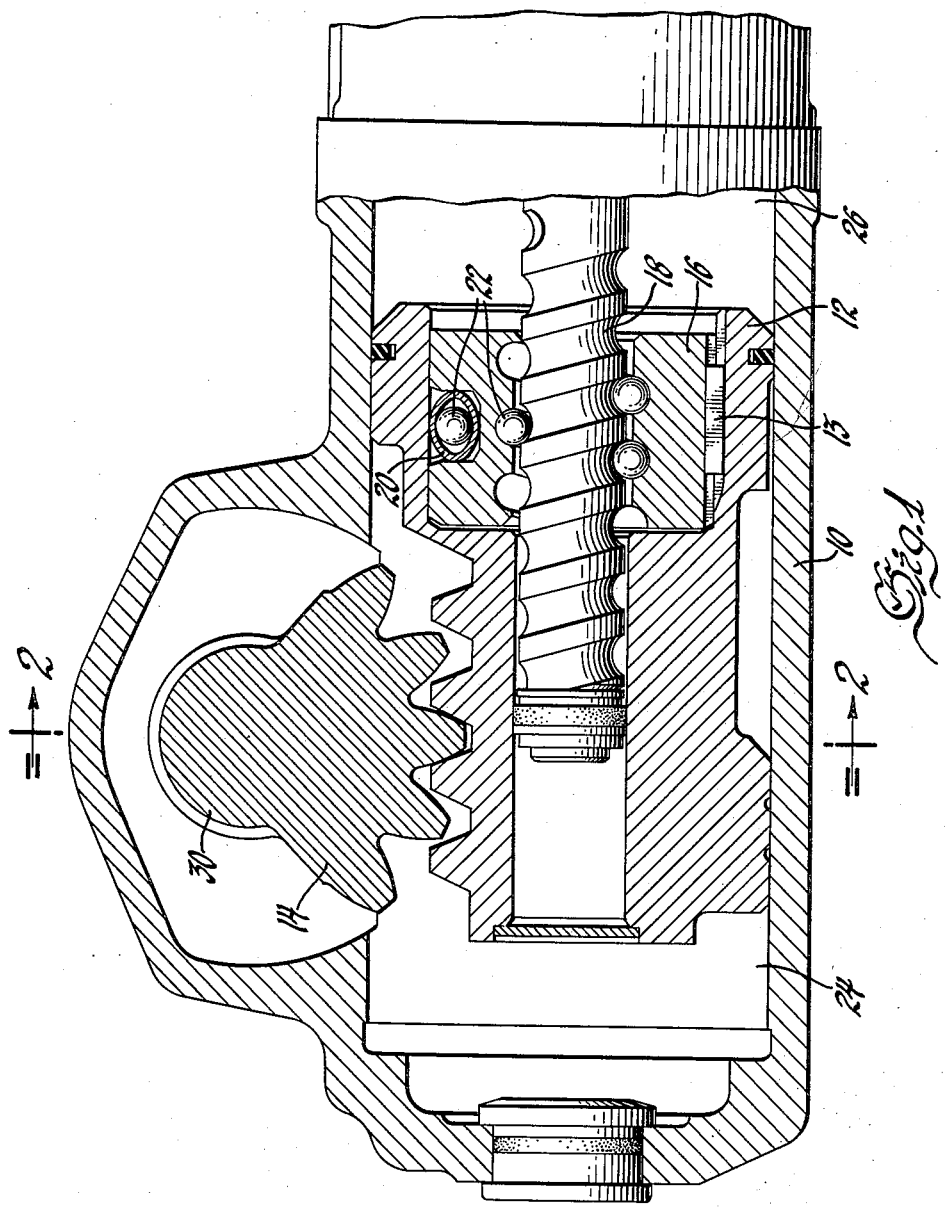
INVENTOR
Robert E. Osborne
BY
J. C. Thorpe
ATTORNEY Dec. 20, 1960    R. E. OSBORNE    2,964,967
STEERING GEAR OR THE LIKE
Filed April 19, 1957    2 Sheets-Sheet 2
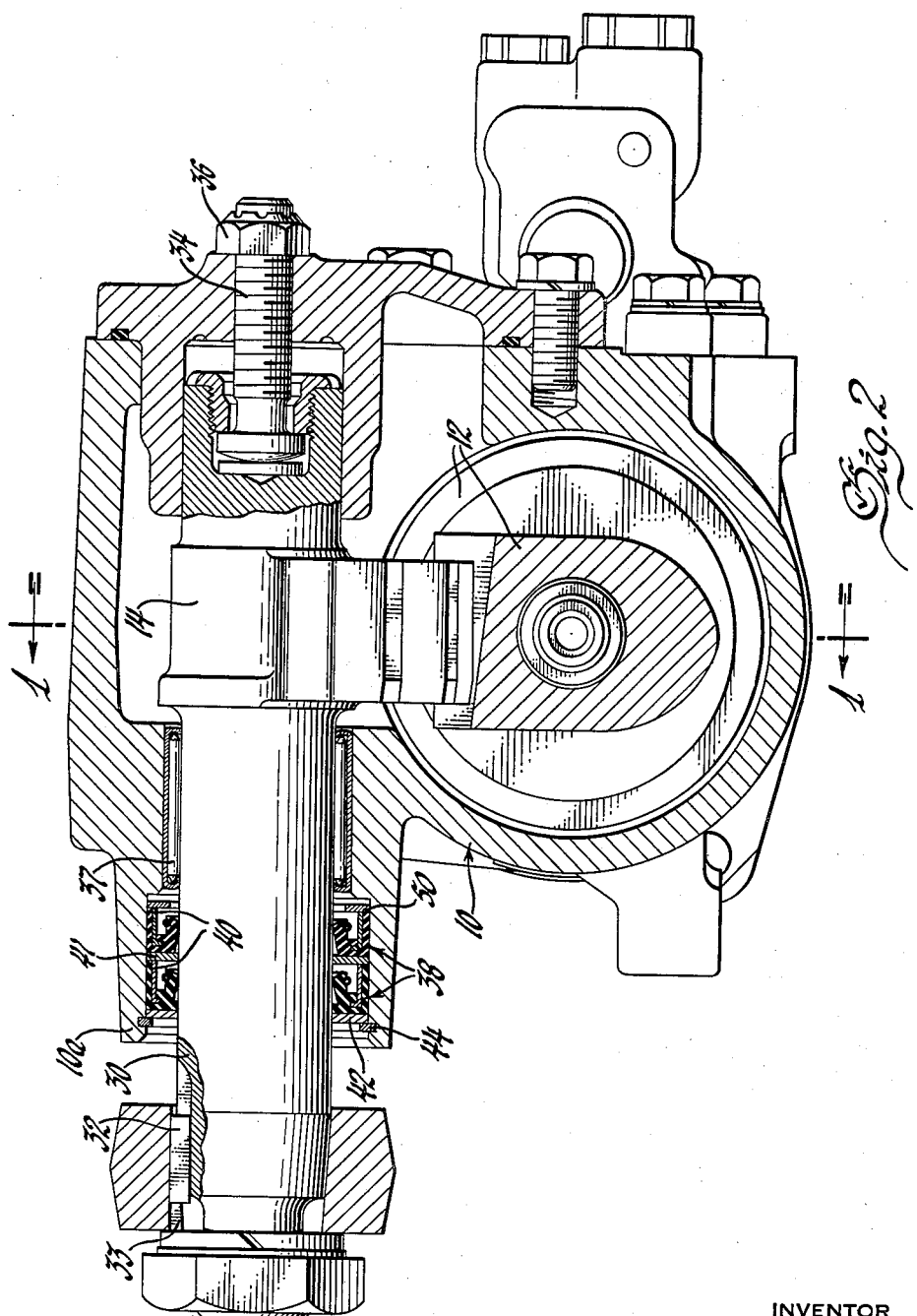
INVENTOR
Robert E. Osborne
BY
S. C. Thorpe
ATTORNEY +# United States Patent Office 2,964,967
Patented Dec. 20, 1960

2,964,967

STEERING GEAR OR THE LIKE

Robert E. Osborne, Birmingham, Mich., assignor to General Motors Corporation, Detroit, Mich., a corporation of Delaware Filed Apr. 19, 1957, Ser. No. 653,993

8 Claims. (Cl. 74—498)

This invention has relation to devices of the type comprising a casing confining a lubricating fluid or the like and housing a part extending through a seal in the casing to a point outwardly thereof. More particularly, the invention is directed to the provision of means operating to prevent corrosion of the metal in the seal area.

Such corrosion is quite pronounced, for example, in the instance of pitman arm shafts in steering gears, where it is believed caused by moisture or water entrained or otherwise carried in the gear lubricant. This water or moisture may be inherently present in the lubricating fluid or it may represent a contaminant developing incident to the aging of the fluid. In any case, the problem is a serious one, particularly in that the shaft may eventually become pitted, giving rise to inadequate sealing with loss of lubricant.

In the instance of many hydraulic power steering gears, the hydraulic fluid also serves as the lubricant for the gearing. Since the hydraulic pressure may reach upwards of 800 p.s.i., the fluid loss may be so great, where pitting of the pitman arm shaft has occurred, that improper functioning of the power apparatus results.

The invention will be described in terms of a preferred embodiment thereof illustrated by the accompanying drawings in which:

Fig. 1 is a longitudinal section through a portion of a gear box; and

Fig. 2 is a transverse section on line 2—2 in Fig. 1.

The parts shown in the drawings are, for the most part, environmental as to this invention, being comprised in the power steering gear to which co-pending application, Serial No. 497,154, filed November 8, 1955, now Patent No. 2,827,123 which issued March 18, 1958, is addressed. Suffice it to say here, that the gear includes a casing 10 housing a piston 12 provided with rack teeth meshing with the teeth of a gear sector 14. Within and fixed to the piston 12 is a ball nut 16 internally helically grooved in a manner complementary to the worm groove 18. The worm may be considered as representing the lower end of the steering shaft, not otherwise shown.

The nut 16 comprises the usual return tube 20, allowing for re-circulation of the balls 22 constituting the connection between the nut, which is fixed to the piston 12 by a key 13. In the operation of the gear, which is filled with hydraulic fluid at all times, a pressure differential is created across the piston 12 to assist the manual effort applied at the steering shaft, this being a function of a control valve, not shown, actuated on axial movement of the shaft. Thus, in the case of a right turn, for example, the pressure in chamber 24 exceeds that in chamber 26 so that the piston tends to move up to swing the gear sector counterclockwise.

Sector 14 has an integral shaft 30 (Figure 2) and carries a key 32 adapted to be accommodated in a complementarily formed keyway 33 in the pitman arm which connects directly the steering linkage. Bolt 34 and the associated nut 36 represent a conventional method of lash adjustment.

Casing 10 has a boss portion 10a through which the shaft 30 extends. Such portion will be seen bored and counterbored for the accommodation of needle bearings 37 and seals 38, desirably formed of oil-resistant synthetic rubber, as neoprene, for example. Each such seal, as is conventional, comprises a reinforcing annulus 40. The outer seal abuts an ordinary steel washer 42, which in turn contacts a snap ring 44 received in an annular groove in the boss portion 10a. The outer face of the inner seal 38 abuts a washer 41 similar to the washer 42.

In accordance with the invention, there is interposed between the innermost seal and the needle bearings a second washer 50 serving to prevent corrosion of the shaft 30 in the seal area. Such washer is formed of a metal containing at least 50% by weight of an alkaline metal, e.g., magnesium, calcium, barium, sodium, potassium, etc. As indicated, I means by the term "alkaline metal" to embrace both alkali metals and alkaline earth metals.

Magnesium is the metal particularly preferred and my experience suggests that for optimum results a magnesium alloy containing more than about 90% magnesium is desirable. As exemplary of such an alloy, the following analysis is provided:

|  | Percent |
|---|---|
| Aluminum | 4.1–5.5. |
| Zinc | .4–1.3. |
| Manganese | .15 min. |
| Silicon | .30 max. |
| Copper | .05 max. |
| Nickel | .005 max. |
| Iron | .005 max. |
| Calcium | .3 max. |
| Other elements | .3 max. |
| Magnesium | Balance. |

The above alloy has an ultimate tensile strength of 37,000 lbs. p.s.i. annealed, and 42,000 lbs. p.s.i. hard rolled, while the percentage elongation is 8.3 and 3.0 respectively. It is generally similar to SAE alloy 512.

I cannot fully explain the high degree of anticorrosive action which the simple expedient of the washer provides, but it would seem that a chemical reaction occurs during which the magnesium sacrifices itself in some way to the corrosive agents that are present or formed in the hydraulic or lubricating fluid. At any rate, it is clear that the washer affords protection both to the fluid and the iron of which the pitman arm shaft is primarily constituted. It is interesting fact that a piece of magnesium alloy when attached to the pitman arm shaft inwardly of the needle bearings failed to inhibit the corrosion, even though the alloy was immersed in the fluid in contact with the portion of the shaft which became corroded. This emphasizes the importance of locating the washer in the critical seal area.

I am aware, of course, of prior disclosures suggesting the use of magnesium as a means of preventing corrosion in hot water heaters, for example. In that application, however, the location of the metal seems of little importance and it consequently appears that the mechanism of the reaction providing the protection must be different. It is generally accepted that in such cases the corrosion inhibiting action derives from a part of the magnesium passing into aqueous solution in the form of ions, leaving the remainder of the metal charged with an equivalent amount of electricity of opposite sign from that carried by the ions. The resulting difference in potential between the magnesium and the solvent containing the freed ions is understood as bringing about selective reaction of the magnesium with the corrosion-producing agents, e.g., oxygen and strong acids or bases deriving from the hydrolysis of salts contained in the water.

Clearly, if the modus operandi of the magnesium in the instance of my invention were as just described, then there would be no criticality as to the location of the magnesium piece.

What I claim is:

1. In an assemblage including a casing confining a fluid tending to become corrosive and further including a movable part extending from within said casing to a point without the same, said part having a bearing in said casing and having associated therewith a seal designed to retain said fluid, said seal being located outwardly of said bearing, the improvement which comprises positioning a metal element containing upwards of 50% alkaline metal mediate said bearing and said seal.

2. In an assemblage including a casing confining a fluid tending to become corrosive and further including a rotatable part extending from within said casing to a point without the same, said part having a bearing in said casing and having associated therewith a seal designed to retain said fluid, said seal being located outwardly of said bearing, the improvement which comprises positioning a metal element containing upwards of 50% magnesium mediate said bearing and said seal.

3. In an asasemblage including a casing confining a fluid tending to become corrosive and further including a movable part extending from within said casing to a point without the same, said part having a bearing in said casing and being surrounded by a seal designed to retain said fluid, said seal being located outwardly of said bearing, the improvement which comprises positioning a metal element containing upwards of 90% alkaline metal mediate said bearing and said seal and immediately adjacent the latter.

4. The improvement defined by claim 3 where said metal element contains upwards of 90% magnesium.

5. In an assemblage including a casing confining a fluid tending to become corrosive and further including a rotatable shaft extending from within said casing to a point without the same, said shaft having a bearing in said casing and being surrounded by a seal designed to retain said fluid, said seal being located outwardly of said bearing, the improvement which comprises positioning a metal washer containing upwards of 50% alkaline metal about said shaft mediate said bearing and said seal and immediately adjacent the latter.

6. An assemblage as defined by claim 5 where said washer contains upwards of 90% magnesium.

7. In a steering gear including a casing confining a body of lubricating fluid and housing a gear sector actuated incident to the steering operation, said sector being carried on a shaft having a bearing in said casing and mounting a pitman arm outward thereof, said shaft being surrounded by a seal located outwardly of said bearing, the improvement which comprises locating a metal washer containing upwards of 50% alkaline metal mediate said bearing and said seal and immediately adjacent the latter.

8. In a steering gear including a casing confining a body of lubricating fluid and housing a gear actuated incident to the steering operation, said sector being carried on a shaft having a bearing in said casing and mounting a pitman arm outwardly thereof, said shaft being surrounded by a composite seal located outwardly of said bearing and comprising a pair of reinforced elastomeric elements spaced by a washer of ferrous material, the improvement which comprises positioning a metal washer containing upwards of 90% magnesium mediate said bearing and said composite seal and immediately adjacent the latter.

References Cited in the file of this patent

UNITED STATES PATENTS

| | | |
|---|---|---|
| 1,327,173 | Smith | Jan. 6, 1920 |
| 2,233,902 | Schmied | Mar. 4, 1941 |
| 2,276,225 | Carter | Mar. 10, 1942 |
| 2,675,715 | Lincoln | Apr. 20, 1954 |
| 2,685,565 | Jones et al. | Aug. 3, 1954 |
| 2,760,636 | Johnson | Aug. 28, 1956 |

FOREIGN PATENTS

J. C. Whitney Catalogue No. 119, page 41 (1946).
Magna-Power Pamphlet, January 1950.